United States Patent [19]

Chan

[11] Patent Number: 5,109,447

[45] Date of Patent: Apr. 28, 1992

[54] HIGH-POWERED, SPECTRALLY FLAT, VERY BROADBAND OPTICAL SOURCE INCLUDING OPTICAL COUPLER AND METHOD USING SAME

[75] Inventor: Eric Y. Chan, Mercer Island, Wash.

[73] Assignee: The Boeing Company, Seattle, Wash.

[21] Appl. No.: 664,615

[22] Filed: Mar. 4, 1991

[51] Int. Cl.$^5$ .......................... G02B 6/26; H04J 1/00; H01J 5/16; H01S 3/19

[52] U.S. Cl. ............................ 385/45; 385/35; 385/49; 385/89; 359/131; 359/133; 359/188; 250/227.11; 250/227.28; 250/226; 372/50

[58] Field of Search ............ 350/96.11, 96.12, 96.15, 350/96.16, 96.17, 96.18, 96.20, 320; 370/1, 3; 455/608, 610, 612, 617; 250/227.11, 227.28, 566, 226; 372/43, 44, 50; 385/33, 35, 44, 38, 45, 48, 49, 89; 359/127, 131, 133, 188

[56] References Cited

U.S. PATENT DOCUMENTS

| | | | |
|---|---|---|---|
| 3,633,035 | 1/1972 | Uchida | 250/199 |
| 4,107,518 | 8/1978 | McMahon | 250/199 |
| 4,232,385 | 11/1980 | Hara et al. | 370/3 |
| 4,318,058 | 3/1982 | Mito et al. | 372/50 |
| 4,341,438 | 7/1982 | Seki et al. | 350/96.16 |
| 4,482,994 | 11/1984 | Ishikawa | 370/3 |
| 4,535,440 | 8/1985 | Mannschke | 370/1 |
| 4,688,884 | 8/1987 | Scifres et al. | 350/96.15 |
| 4,726,011 | 2/1988 | Ih et al. | 370/3 |
| 4,748,689 | 5/1988 | Mohr | 455/612 |
| 4,763,975 | 8/1988 | Scifres et al. | 350/96.15 |
| 4,775,972 | 10/1988 | Ih et al. | 370/3 |
| 4,807,227 | 2/1989 | Fujiwara et al. | 370/3 |
| 4,820,010 | 4/1989 | Scifres et al. | 350/96.15 |
| 4,842,357 | 6/1989 | Doneen | 350/96.12 |
| 4,860,279 | 8/1989 | Falk et al. | 370/1 |
| 4,866,698 | 9/1989 | Huggins et al. | 370/1 |
| 4,867,521 | 9/1989 | Mallinson | 350/96.18 |
| 4,871,222 | 10/1989 | Burghardt et al. | 350/96.14 |
| 4,871,226 | 10/1989 | Courtney et al. | 350/96.17 |
| 4,880,289 | 11/1989 | Imoto et al. | 350/96.18 |
| 4,913,510 | 4/1990 | Lynch et al. | 350/96.18 |
| 4,919,506 | 4/1990 | Covey | 350/96.18 |
| 4,928,319 | 5/1990 | Pitt et al. | 455/612 |
| 4,932,742 | 6/1990 | Tohme | 350/96.18 |

Primary Examiner—Brian Healy
Attorney, Agent, or Firm—Foley & Lardner

[57] ABSTRACT

A broadband optical source with a flat spectral output and high output power for use in a fiber optic sensor interface system. The broadband optical source comprises N optical sources such as LEDs, where N is a positive integer greater than 1. The N optical sources output a plurality of optical signals having center wavelengths $\lambda i$, spectral widths $\Delta \lambda i$ and powers Pi, where i is a positive integer corresponding to each of the N optical sources. The broadband LED source also comprises a waveguide coupler for receiving and combining said plurality of optical signals and for outputting a broadband optical signal. The broadband LED source outputs extremely spectrally flat, broadband signals when the center wavelengths $\lambda i$ are separated by approximately $\frac{2}{3}$ of the spectral widths $\Delta \lambda i$.

52 Claims, 15 Drawing Sheets

HIGH-POWERED, SPECTRALLY FLAT, VERY BROADBAND OPTICAL SOURCE INCLUDING OPTICAL COUPLER AND METHOD USING SAME

BACKGROUND OF THE INVENTION

1. Field of the Invention

The present invention relates generally to a broadband optical source. More specifically, it relates to a broadband optical source with a flat spectral output and high output power for use in a fiber optic sensor interface system.

2. Description of the Related Art

Fiber optic sensor interface systems are currently being developed in order to replace corresponding electrical systems used to measure and control the positions of flaps and slats at various locations throughout an aircraft. One approach to replacing an electrical sensor interface system with a fiber optic interface system involves using a broadband optical source which launches optical signals down a plurality of fiber optic paths as discussed, for example, in U.S. Pat. No. 4,842,357, incorporated herein by reference. These optical signals illuminate various reflective surfaces of different sensors corresponding to the flaps and slats. The resulting wavelength encoded reflected signals from the various sensors are de-multiplexed using a glass slab grating (a so-called wavelength de-multiplexing or WDM grating) into a detector array. The detector array is integrated into processing electronics on board the aircraft. The processing electronics determine and control the positions of the flaps and slats using the data output by the detector array. The various sensors used in the fiber optic sensor interface system may not necessarily use optical radiation with the same wavelengths. For example, a first sensor may require radiation with center frequencies $\lambda 11, \lambda 12, \lambda 13$ whereas a second sensor may require radiation with center frequencies at $\lambda 21, \lambda 22, \lambda 23$. Such a "univeral" fiber optic sensor interface system then requires six individual light sources, one for each of the required wavelengths, $\lambda 11, \lambda 12, \lambda 13, \lambda 21, \lambda 22, \lambda 23$. Therefore, it is desireable to use a single optical source capable of outputting appropriate power over a wide spectrum of wavelengths. Such an optical source would preferably have a flat (e.g. $\leq$ 3dB variation), broadband (spanning e.g. from 0.75 $\mu$m to 0.9 $\mu$m) spectrum and should be capable of relatively high (e.g. $\geq$ ]500 $\mu$w) output power levels. Particular requirements are determined by the fiber optic sensor interface system requirements. The desired flatness, for example, is determined by the dynamic range of the fiber optic sensor interface system.

SUMMARY OF THE INVENTION

A novel approach to the construction and packaging of a broadband optical source will be described. The broadband optical source is capable of outputting a cw high powered signal with a flat frequency spectrum, thereby enabling the broadband optical source to be used in a universal fiber optic sensor interface system.

The above and other objects are attained by a broadband optical source having N optical sources, where N is a positive integer and $N \geq 2$, the N optical sources outputting a plurality of optical signals having center wavelengths $\lambda i$, spectral widths $\Delta \lambda i$ and powers $P i$, where i is a positive integer corresponding to each of said N optical sources. The broadband optical source also has a waveguide coupler for receiving and combining the plurality of optical signals and for outputting a broadband optical signal.

Alternatively, the above objects can be achieved by a broadband optical source comprising N optical sources, where N is a positive integer and $N \geq 2$, each of the N optical sources outputting optical radiation having a center wavelength $\lambda i$, a spectral width $\Delta \lambda i$ and power $Pi$, where i is a positive integer corresponding to each of the N optical sources. The broadband optical source further has a plurality of interference filters for combining the optical radiation into a plurality of pairs of optical signals. The broadband optical source also has a plurality of input fibers for receiving the plurality of pairs of optical signals at a first end of the plurality of input fibers, and a waveguide coupler, optically coupled to a second end of the plurality of input fibers, for combining the plurality of pairs of optical signals and for outputting a broadband optical signal.

In addition, the above objects can be achieved by a method for producing a broadband optical signal comprising the steps of selecting, according to a broadband optical source design model, a plurality of optical sources, the plurality of optical sources outputting a plurality of optical signals with center wavelengths $\lambda i$, spectral widths $\Delta \lambda i$ and powers Pi. The method includes combining the plurality of optical signals resulting in the broadband optical output.

Finally, the above objects can be achieved by a fiber optic sensor interface system comprising N optical sources, where N is a positive integer and optical signals having center wavelengths $\lambda i$, spectral widths $\Delta \lambda i$ and powers Pi, where i is a positive integer corresponding to each of the N optical sources. The fiber optic sensor interface system also comprises a waveguide coupler for receiving and combining the plurality of optical signals and for outputting a broadband optical signal, and a sensor head, optically coupled to the waveguide coupler, for receiving and encoding the broadband optical signal and for outputting an encoded broadband optical signal.

Other objects and advantages of this invention will become apparent from the following description and accompanying drawings.

BRIEF DESCRIPTION OF THE DRAWINGS

FIG. (1) shows a top view of the broadband LED source 1.

FIG. (2) shows a fiber optic sensor system which uses the broadband LED source 1.

Figure 1:
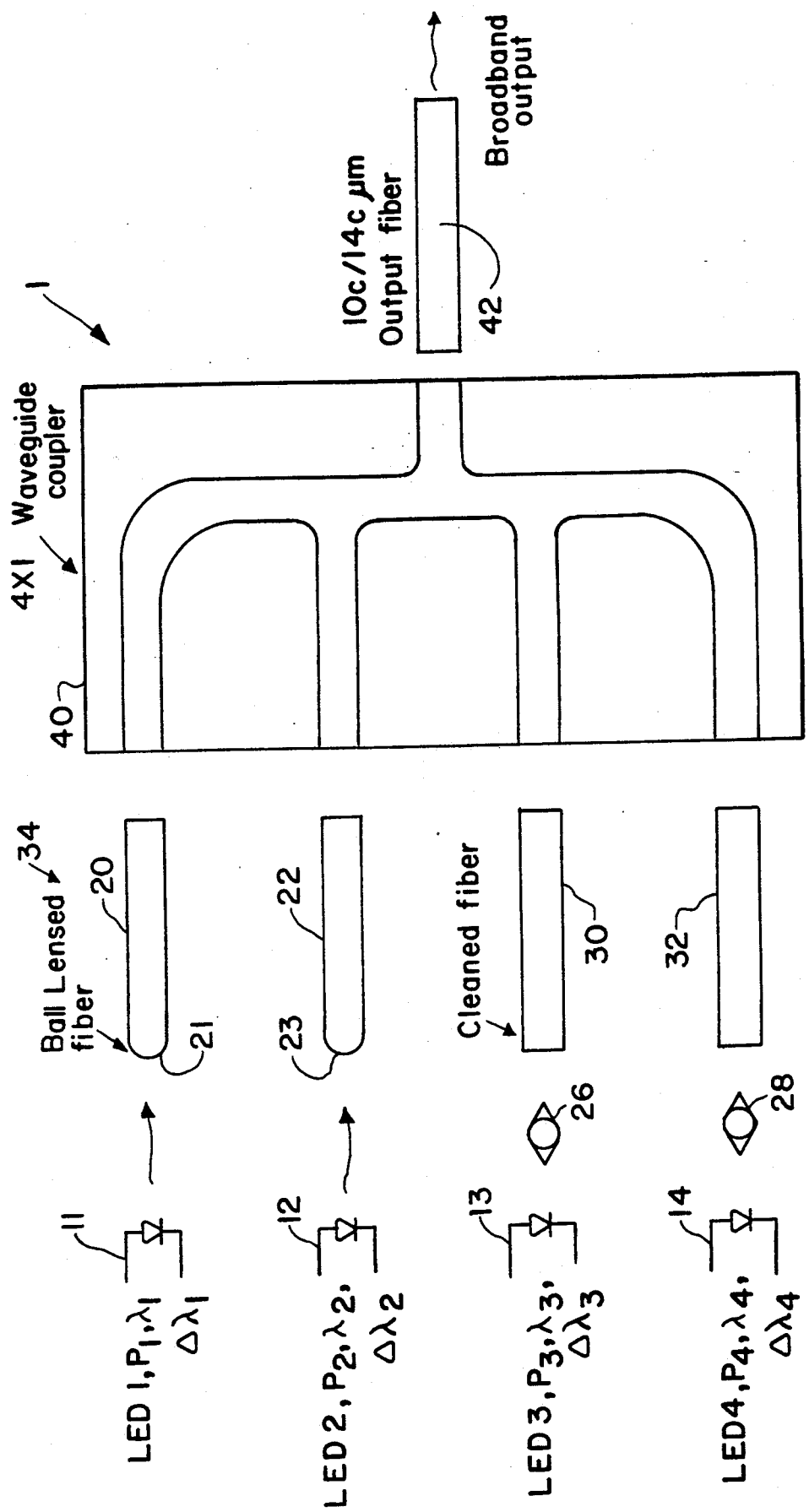
Figure 2:
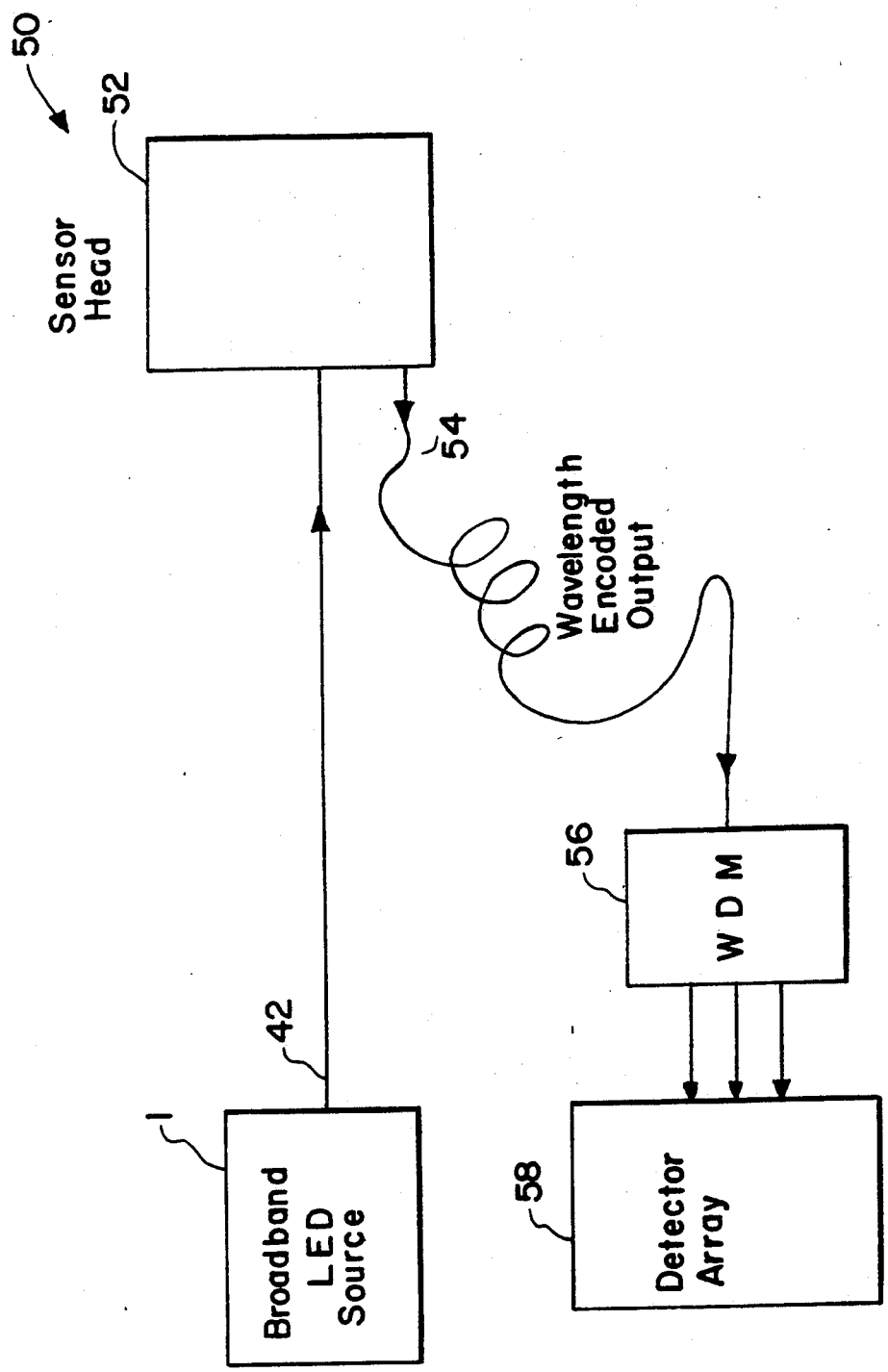
Figure 3:
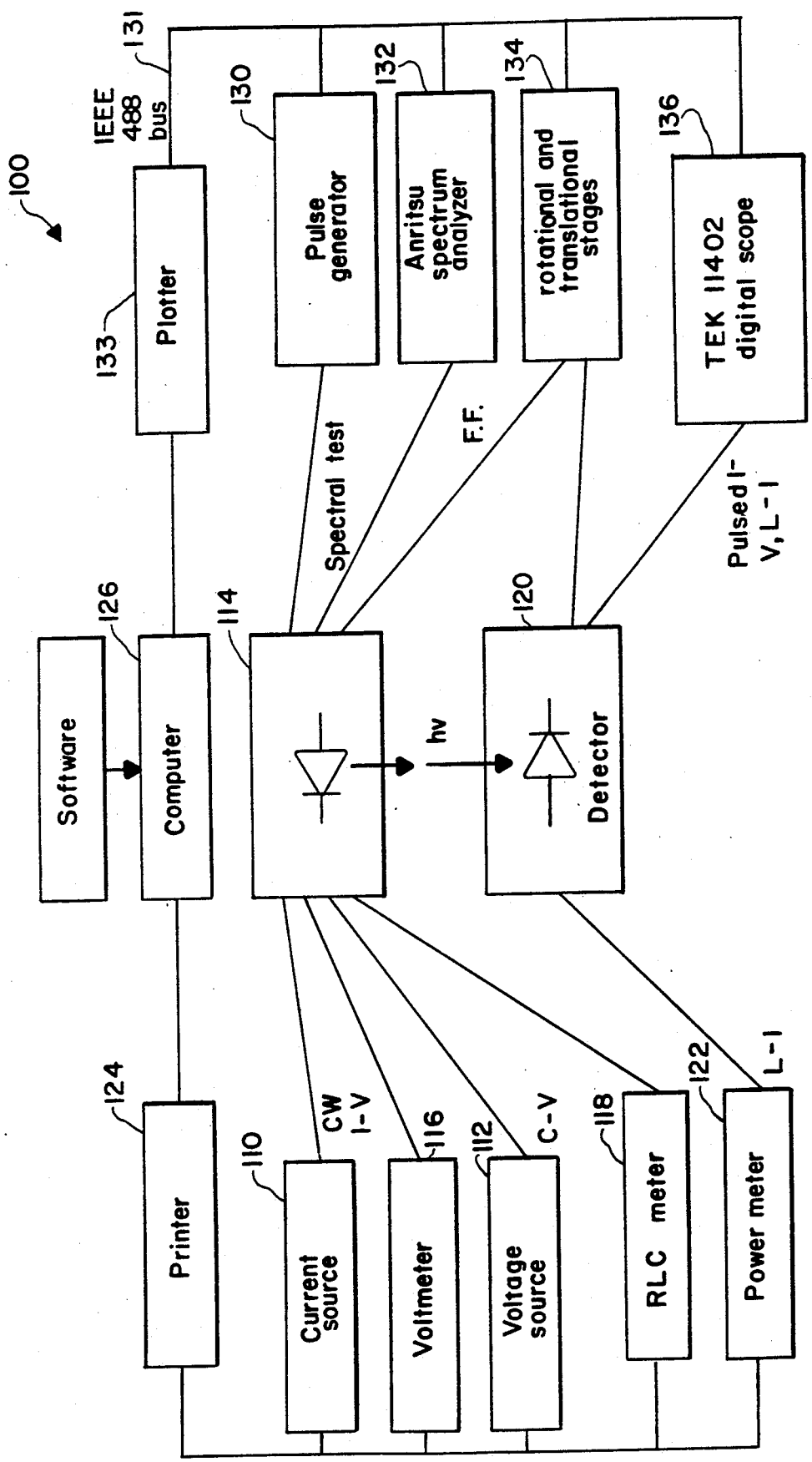
Figure 4:
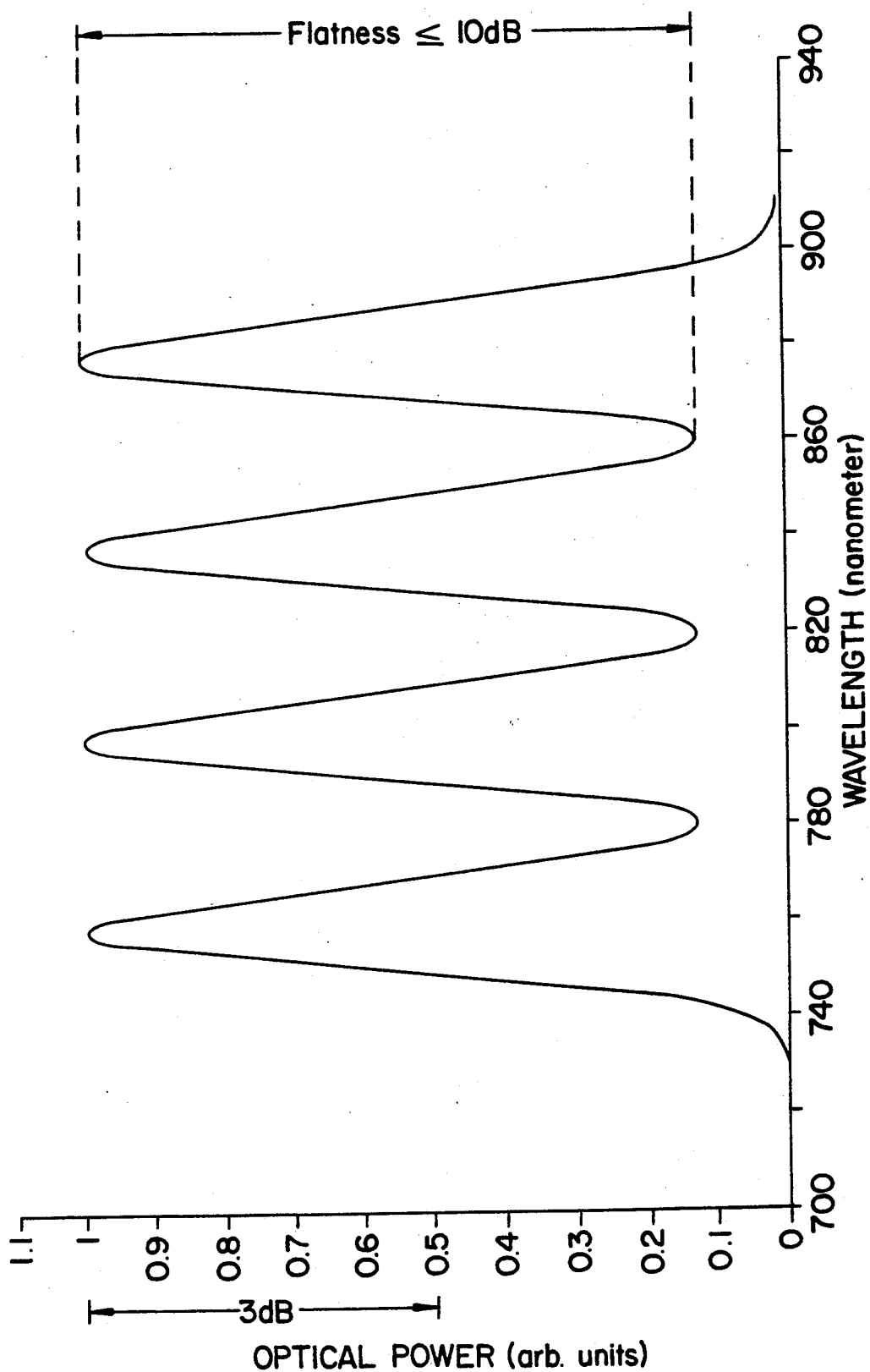
Figure 5:
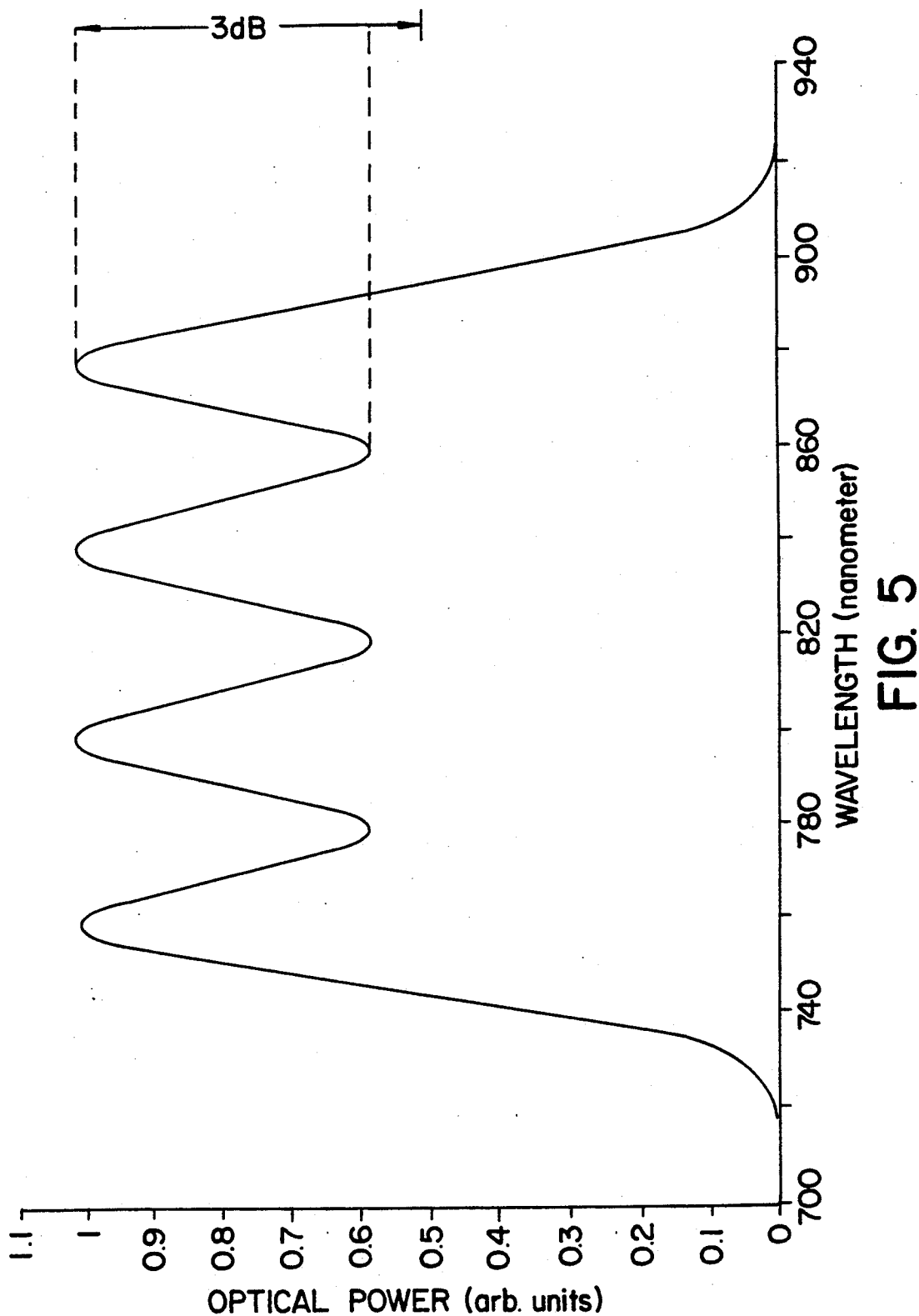
Figure 6:
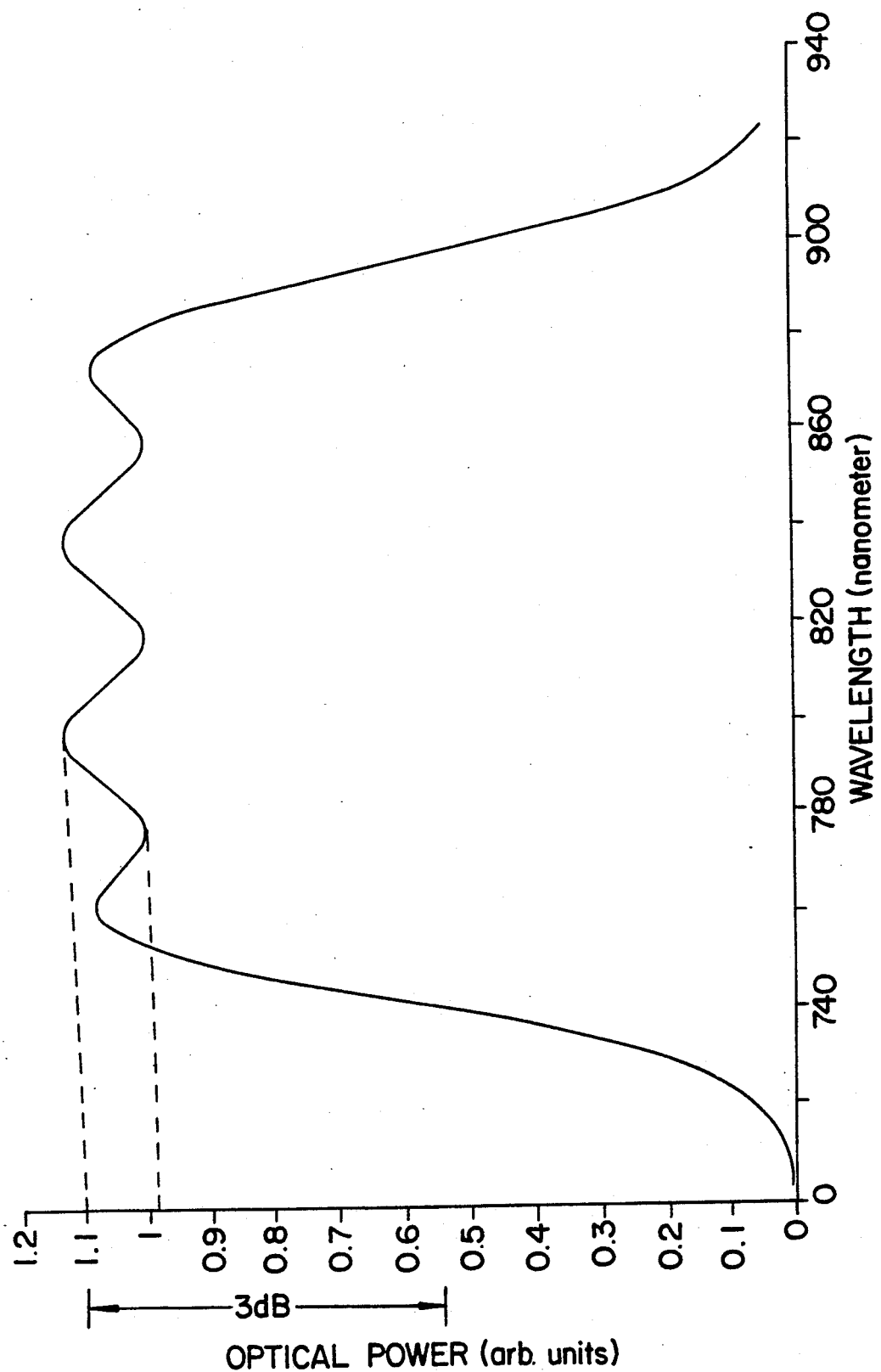
Figure 7:
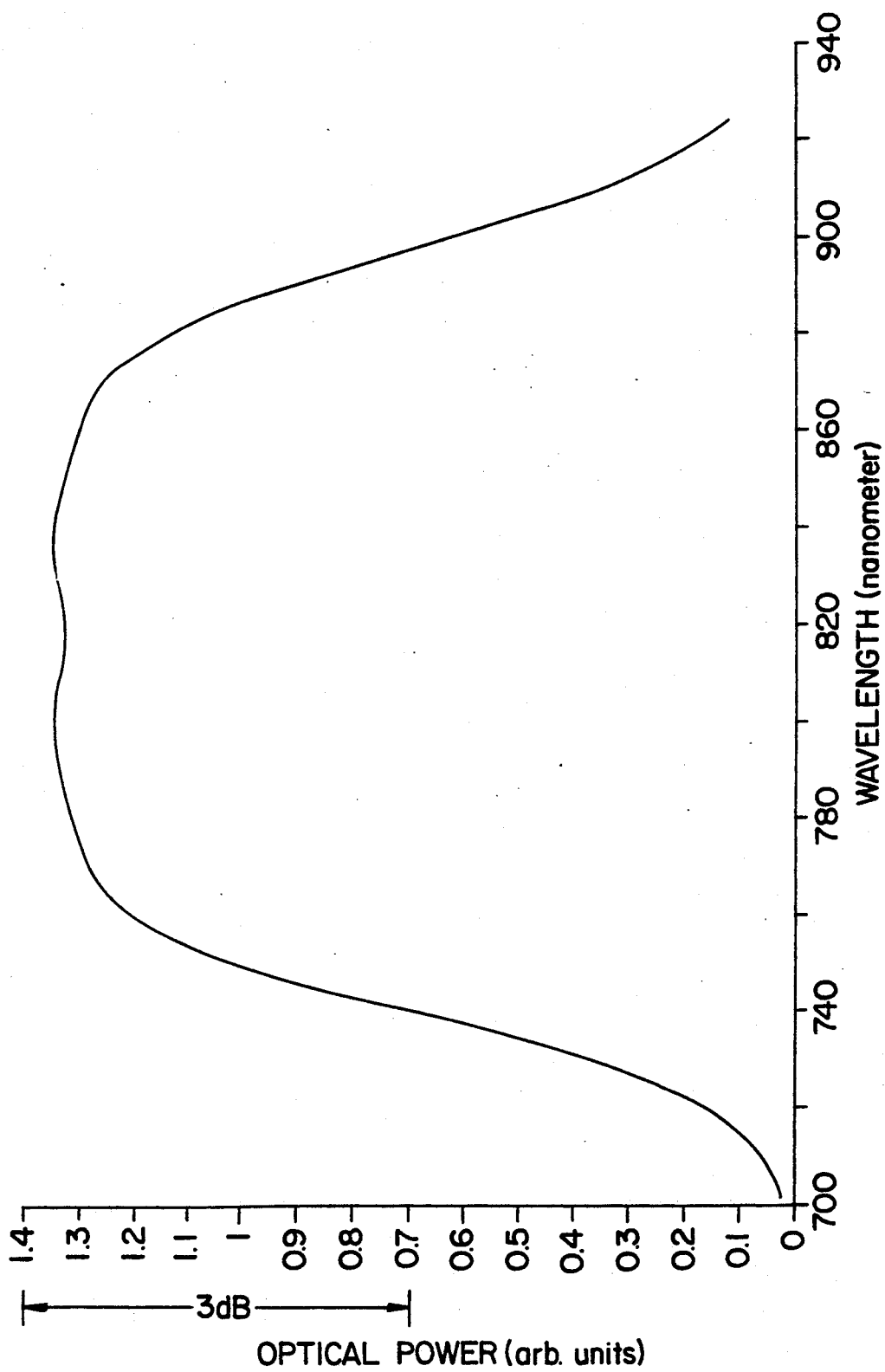
Figure 8:
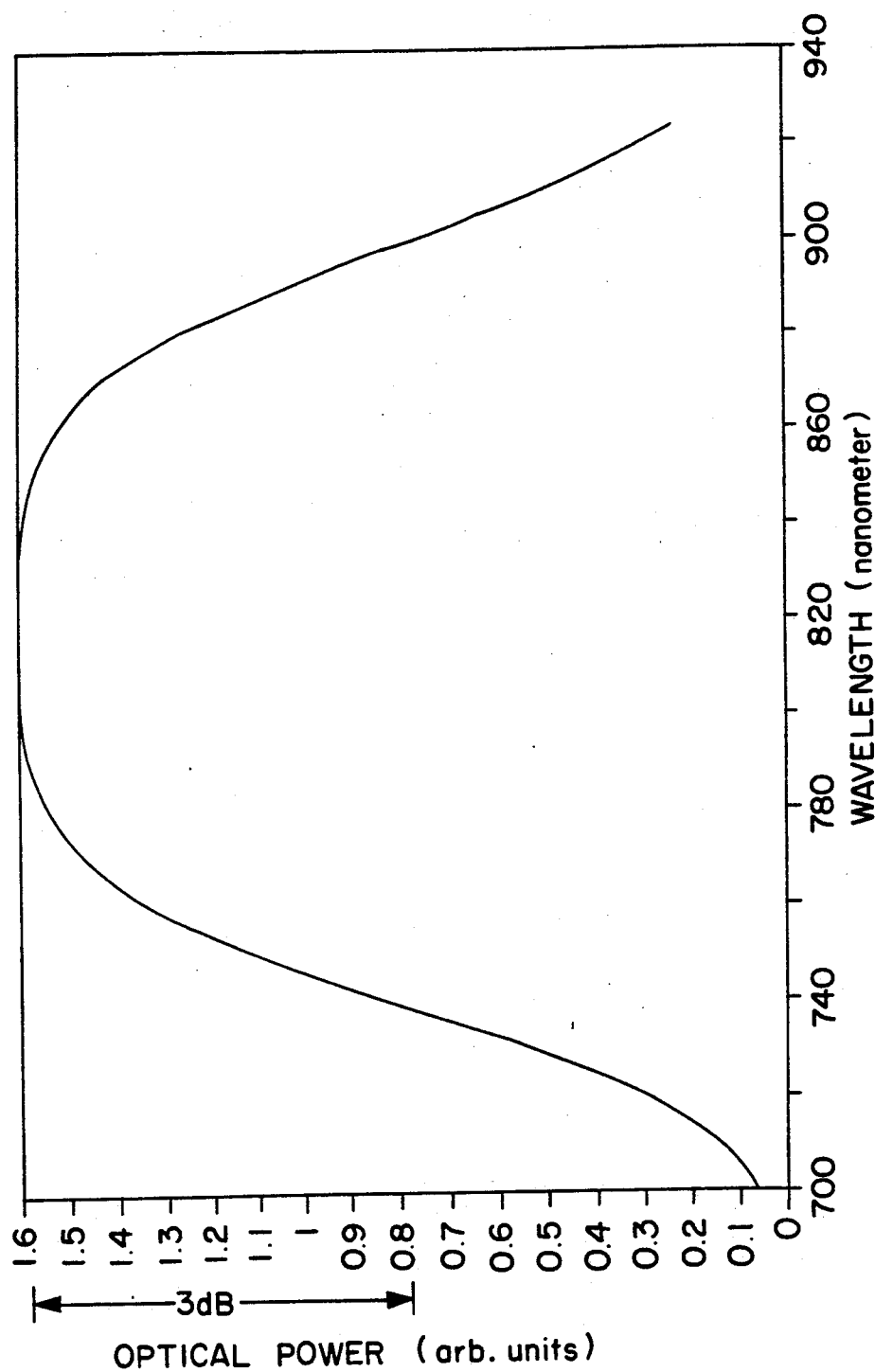
Figure 9:
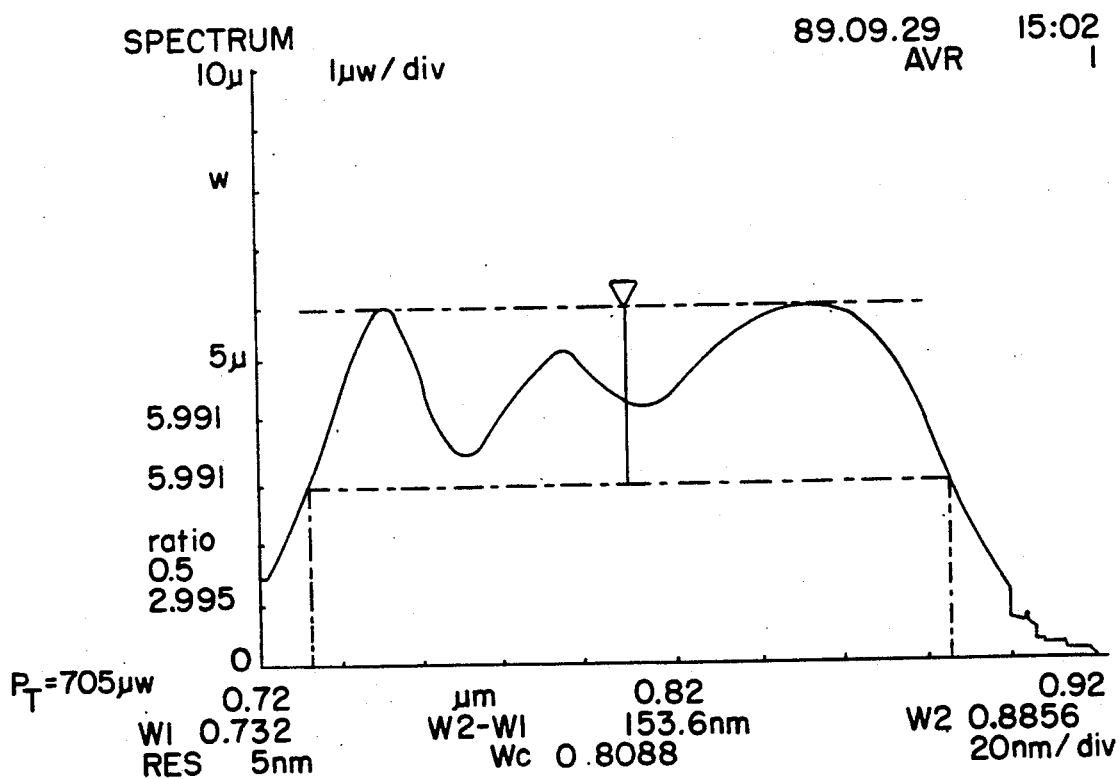
Figure 10:
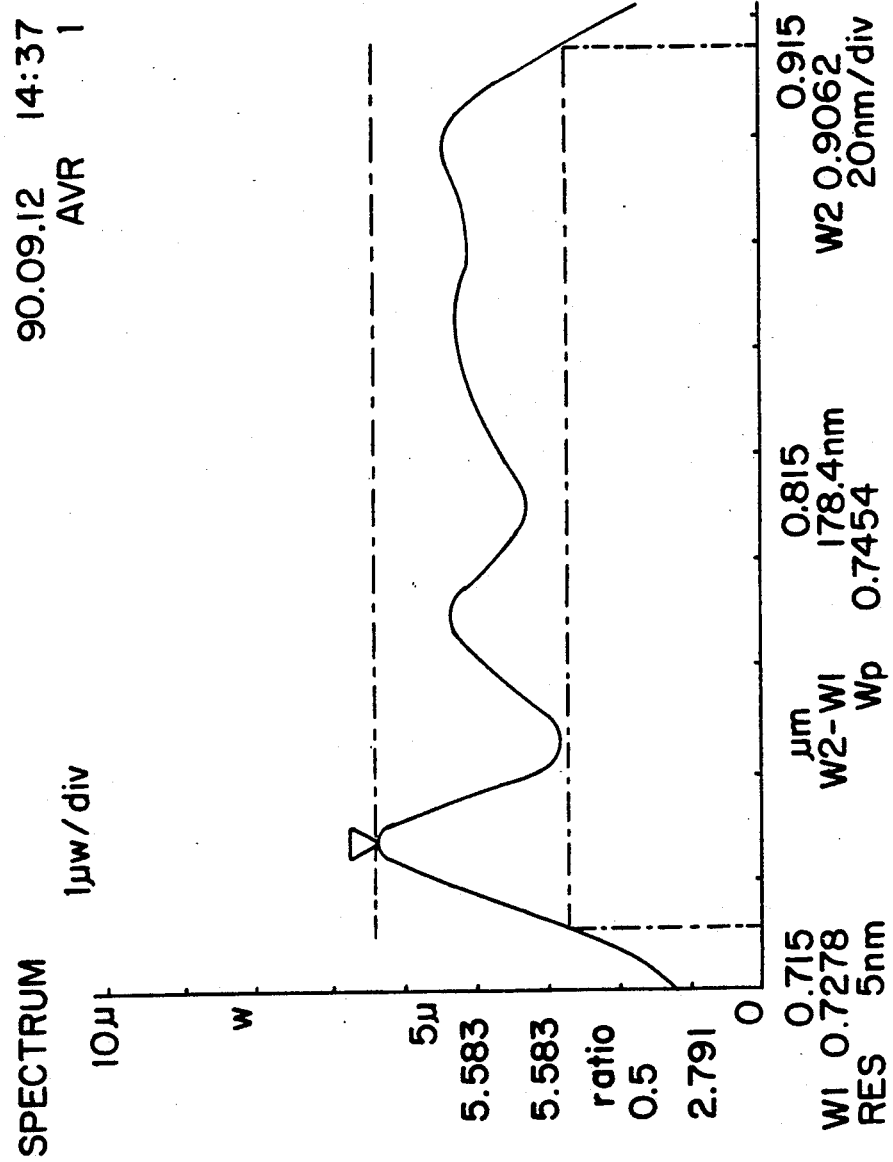
Figure 11:
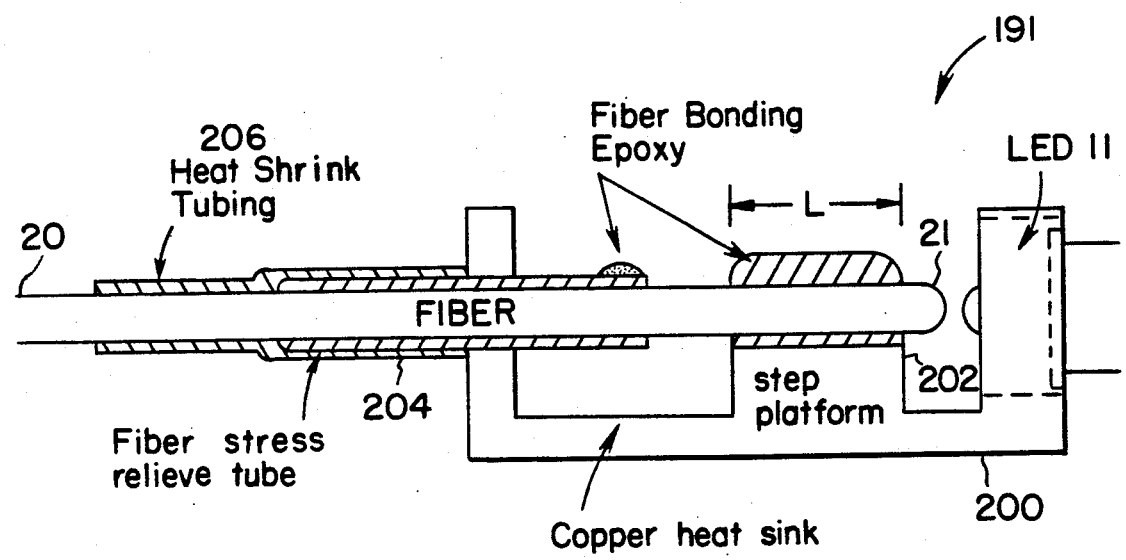
Figure 12:
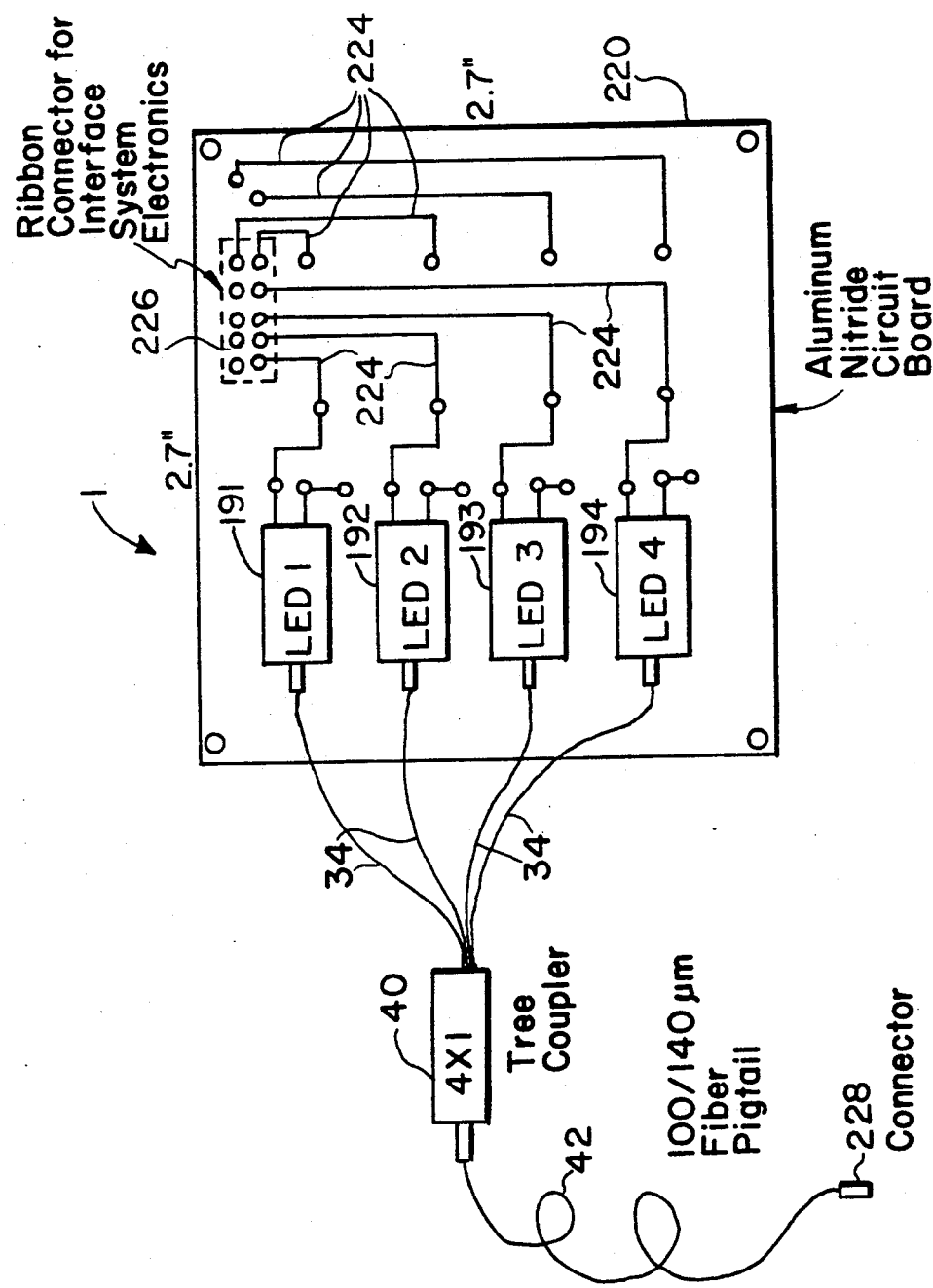
Figure 13:
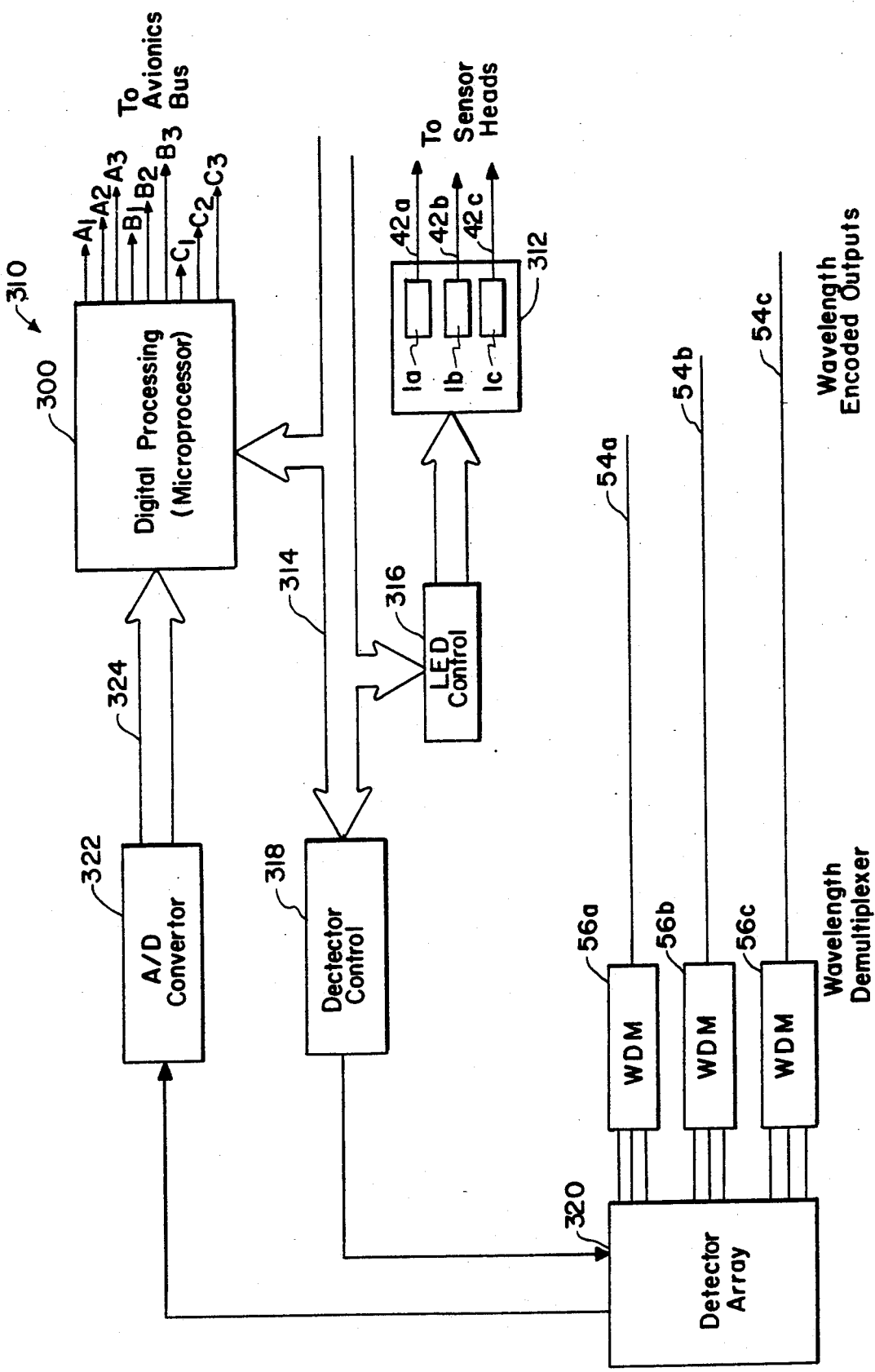
Figure 14:
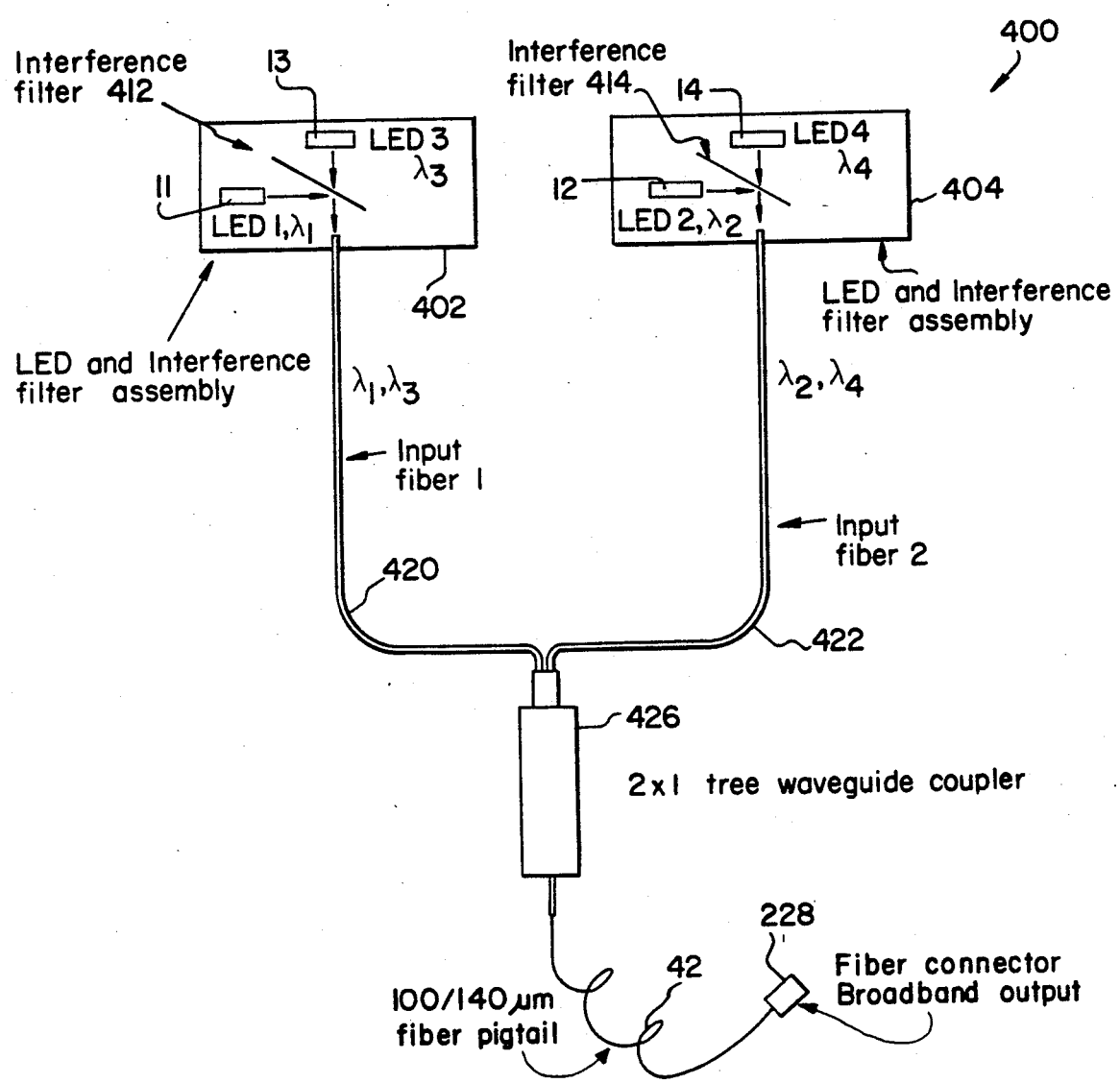
Figure 15:
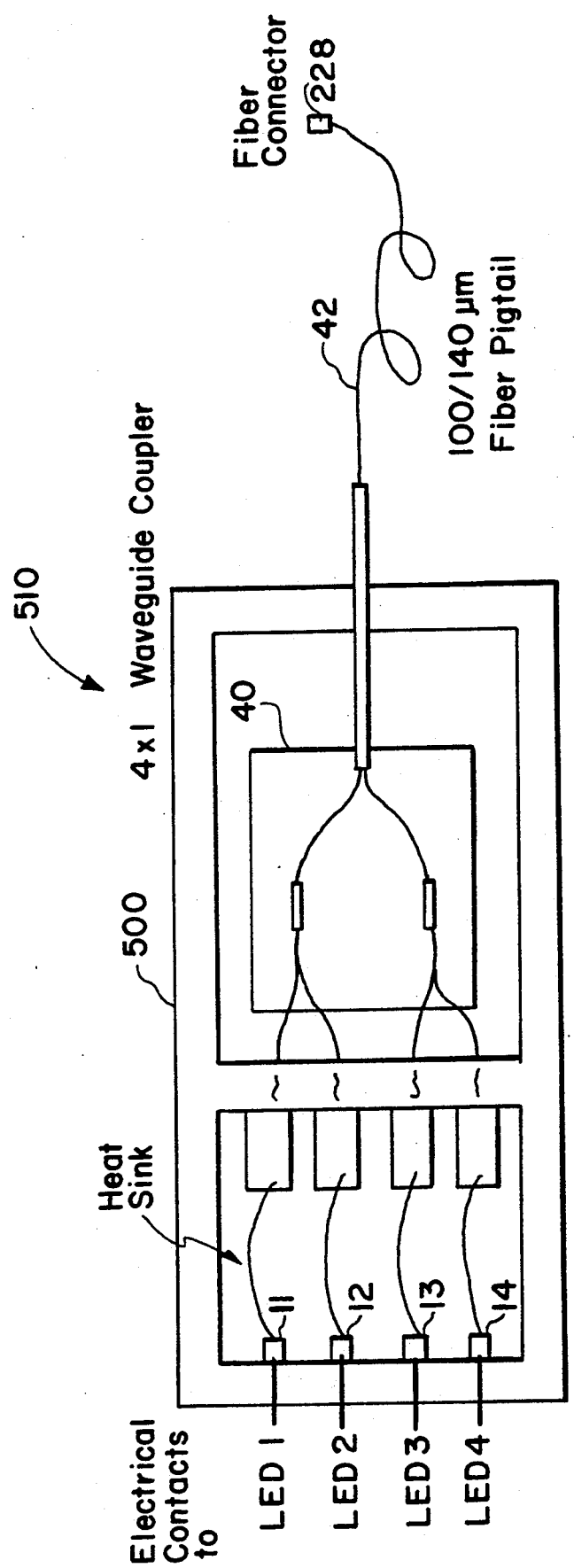

FIG. (3) shows an automatic optoelectronic device characterization system 100 for characterizing the LEDs 11-14 in the broadband LED source 1.

FIG. (4) shows the predicted spectral output of the broadband LED source 1, where the LEDs 11-14 have peak amplitudes or peak optical powers $P1 = P2 = P3 = P4 = 1$, center wavelengths $\lambda 1 = 0.76$ micrometers, $\lambda 2 = 0.8$ micrometers, $\lambda 3 = 0.84$ micrometers and $\lambda 4 = 0.88$ micrometers, and spectral widths $\Delta \lambda 1 = \Delta \lambda 2 = \Delta \lambda 3 = \Delta \lambda 4 = 20$nm.

FIG. (5) shows the predicted spectral output of the broadband LED source 1, where the LEDs 11-14 have the same peak amplitudes and center wavelengths as in FIG. (4), but with spectral widths $\Delta \lambda 1 = \Delta \lambda 2 = \Delta \lambda 3 = \Delta \lambda 4 = 30$nm.

FIG. (6) shows the predicted spectral output of the LED source 1, where the LEDs 11-14 have the same peak amplitudes and center wavelengths as in FIG. (4), but with spectral widths $\Delta\lambda1 = \Delta\lambda2 = \Delta\lambda3 = \Delta\lambda4 = $ 40nm.

FIG. (7) shows the predicted spectral output of the broadband LED source 1, where the LEDs 11-14 have the same peak amplitudes and center wavelengths as in FIG. (4), but with spectral widths $\Delta\lambda1 = \Delta\lambda2 = \Delta\lambda3 = \Delta\lambda4 = $ 50nm.

FIG. (8) shows the predicted spectral output of the broadband LED source 1, where the LEDs 11-14 have the same peak amplitudes and center wavelengths as in FIG. (4), but with spectral widths $\Delta\lambda1 = \Delta\lambda1 = \Delta\lambda3 = \Delta\lambda4 = $ 60nm.

FIG. (9) shows a first actual spectral output of the broadband LED source 1.

FIG. (10) shows a second actual spectral output of the broadband LED source 1.

FIG. (11) shows a side view of a mounting for one of the LEDs 11-14 in the broadband LED source 1.

FIG. (12) shows a top view of a mounting for the broadband LED source 1.

FIG. (13) shows a universal fiber optic sensor interface system 310 in which a series of broadband LED sources 1a-1c can be used.

FIG. (14) shows a modified broadband LED source 400 which is a second embodiment of the broadband LED source 1.

FIG. (15) shows a hybrid package 510 for mounting the broadband LED source 1 or the modified broadband LED source 400, using only a single heat sink block 500 for all four LEDs 11-14.

DETAILED DESCRIPTION OF THE PREFERRED EMBODIMENTS

FIG. (1) shows a first embodiment of the broadband LED source 1. The broadband LED source 1 has four LED sources, LED 11, LED 12, LED 13 and LED 14. LEDs 11, 12, 13 and 14 have center wavelengths $\lambda1$, $\lambda2$, $\lambda3$ and $\lambda4$, output power levels P1, P2, P3 and P4 (here, output power level is defined to be the peak optical power level or peak amplitude at the corresponding center wavelength $\lambda i$), and spectral widths $\Delta\lambda1$, $\Delta\lambda2$, $\Delta\lambda3$ and $\Delta\lambda4$ (here, the spectral widths are defined to be the full width half maximum, FWHM of the power spectrum output by the corresponding LED), respectively. The LEDs 11-14 can be Hitachi HLP40RB type, for example.

The radiation output from LED 11 and LED 12 is input to ball lensed fibers 20 and 22 via ball lenses 21 and 23, respectively. The radiation output from LED 13 and LED 14 are input to micro-lenses 26 and 28, and the radiation output from micro-lenses 26 and 28 is input to cleaved fibers 30 and 32, respectively. Ball lensed fibers 20, 22 with ball lenses 21, 23, along with cleaved fibers 30, 32 comprise input fibers 34 for a 4 × 1 waveguide coupler 40 which serves to add the light from the four fibers to produce a composite light source. The waveguide coupler 40 can be, for example, a tree coupler. The radiation output from LEDs 1114 14 appears at an output fiber 42.

Although the input fibers 34 are shown to have two ball lensed fibers 20, 22 and two cleaved fibers 30, 32, any one of the input fibers 34 can be either a ball lensed fiber or a cleaved fiber. The input fibers 34 in FIG. (1) were chosen to comprise two ball lensed fibers and two cleaved fibers for exemplary purposes only. Finally, the number of LEDs used in the broadband LED source 1 need not necessarily be four.

FIG. (2) shows a fiber optic sensor system 50 in which the broadband LED source 1 can be used. The output fiber 42 transmits the radiation output from the broadband LED source 1 to a sensor head 52, which can be of the type disclosed in U.S. Pat. No. 4,842,357 as sensor head 10. A return fiber 54 transmits a wavelength encoded output to a wavelength demultiplexer (WDM) 56, which wavelength demultiplexes the encoded return signal and a resulting demultiplexed encoded return signal is detected by a detector array 58. The detector array 58 can be, for example, a silicon CCD array. The WDM 56 can be realized, for example, by a slab grating or by demultiplexer 142 shown in FIG. (4) of U.S. Pat. No. 4,842,357. Also, the output fiber 42 and the return fiber 54 can be a single fiber such as optical fiber 14, followed by a splitter 138, both of which are shown in FIG. (4) of U.S. Pat. No. 4,842,357.

The number of LEDs used in the broadband source 1, the power levels Pi, the center wavelengths $\lambda i$, and the spectral widths $\Delta\lambda i$, where $i = 2, 3 \ldots N$ (where N is the number of LEDs in the broadband LED source 1) are chosen so that a particular output power Po, a particular center wavelength $\lambda c$ and a particular spectral width $\Delta\lambda$ are produced at the output fiber 42 of the broadband LED source 1. However, there are many possible combinations of individual LED wavelengths $\lambda i$, spectral widths $\Delta\lambda i$ and peak amplitudes Pi which can produce the center wavelengths $\lambda c$, the spectral widths $\lambda\Delta$ and output power Po. In addition, each LED's spectral characteristics are specified in a range of values. For example, Hitachi specifies their HLP40RB type LEDs with 30nm $\leq \Delta\lambda i \leq$ 60nm, 775nm $\leq \lambda i \leq$ 825nm and Pi $\leq$ 35mW, and consequently each LED's spectral characteristics cannot be obtained simply from the manufacturer's specifications. Therefore, an automatic optoelectronic device characterization system 100 shown in FIG. (3), as well as a broadband optical source design model have been developed in order to quickly characterize the properties of the LEDs, as well as to predict and verify the characteristics at the output of the broadband LED source 1 appearing at fiber 42.

The broadband optical source design model has been developed in order to provide guidance in selecting the LEDs 11-14. The broadband optical source design model relates the individual peak output power Pi, center wavelengths $\lambda i$ and spectral widths $\Delta\lambda i$ of the LEDs 11-14 used to make the broadband LED source 1 having a spectral output Po, a center wavelength $\lambda c$ and a spectral width $\Delta\lambda$. Before the broadband optical source design model is described in detail, the automatic optoelectronic device characterization system 100 will be discussed.

FIG. (3) shows the automatic optoelectronic device characterization system 100 used to quickly characterize individual LEDs. A current source 110 and a voltage source 112 drive an LED to be characterized 114. A voltmeter 116 and an RLC meter 118 monitor the LED to be characterized 114. A detector 120 detects radiation output by the LED to be characterized 114. A power meter 122 monitors the power level detected by the detector 120. The current source 110, the voltmeter 116, the voltage source 112, the RLC meter 118 and the power meter 122 are connected to a printer 124, which in turn is controlled by a computer 126. The printer 124 outputs LED characteristics including current vs. voltage (I-V) characteristics and light output power vs. current (L-I) characteristics.

The automatic optoelectronic device characterization system 100 has a pulse generator 130 and an Anritsu spectrum analyzer 132. The Anritsu spectrum analyzer 132 yields the spectral characteristics of the LED to be characterized 114 such as the spectral width $\Delta\lambda i$, and the center wavelength $\lambda i$ and the power $P_i$, which are output via an IEEE 488 bus 131 to a plotter 133. Rotational and transitional stages 134 are used to measure the far field (FF) of the LED to be characterized 114. Finally, a TEK 11402 digital scope 136 is used to characterize the voltage V and the optical power vs. voltage (L-V) of the LED to be characterized 114 under pulsed conditions.

The automatic optoelectronic characterization system 100 is also used to maximize the coupling efficiency of the LEDs 11-14 used in the broadband LED source 1 to the input fibers 34. In this case, the broadband LED source 1 replaces the LED to be characterized 114 in FIG. (3). The positions of the input fibers 34 in the broadband LED source 1 are adjusted so as to maximize optical coupling between the LEDs 11-14 and the input fibers 34, as will be discussed in detail below with regard to packaging of the broadband LED source 1.

Once the detailed characteristics, in particular, the output power Pi, the center wavelength $\lambda i$., and the spectral width $\Delta\lambda i$ for each LED 11-14 in the broadband LED source 1 are measured, the broadband optical source design model computes the expected output power Po, center wavelength $\lambda c$ and spectral width $\Delta\lambda$ of the broadband LED source 1 in the following manner.

In general, the spectral output of an LED is described by a Gaussian function, $$P_i(\lambda) = P_i \cdot \exp\left[-K_1\left(\frac{\lambda - \lambda i}{\Delta\lambda i}\right)^2\right] \quad (1)$$

where
$K_1$ is a constant empirically determined to be about 2.7
$P_i$ is the peak power at $\lambda_i$
$\lambda i$ = center wavelength
$\Delta\lambda i$ = spectral width The combined output power of four LEDs is given by equations (2a) and (2b), where $$P_0(\lambda) = P_1(\lambda) + P_2(\lambda) + P_3(\lambda) + P_4(\lambda) \quad (2a)$$

$$P_0(\lambda) = P_1 \cdot \exp\left[K_1\left(\frac{\lambda - \lambda_1}{\Delta\lambda_1}\right)^2\right] + \quad (2b)$$

$$P_2 \cdot \exp\left[K_1\left(\frac{\lambda - \lambda_2}{\Delta\lambda_2}\right)^2\right] +$$

$$P_3 \cdot \exp\left[K_1\left(\frac{\lambda - \lambda_3}{\Delta\lambda_3}\right)^2\right] + P_4 \cdot \exp\left[K_1\left(\frac{\lambda - \lambda_4}{\Delta\lambda_4}\right)^2\right]$$

and where P1, $\lambda_1$, $\Delta\lambda_1$; P2, $\lambda_2$, $\Delta\lambda_2$; $\lambda_3$, $\Delta\lambda_3$ and P4, $\lambda_4$, $\Delta\lambda_4$ are the peak amplitudes, center wavelengths and spectral widths for LEDs 11-14, respectively.

The broadband optical source design model may be computed using a programmed digital computer. By inputting the center wavelengths $\lambda i$, the spectral widths $\Delta\lambda i$, and peak amplitudes or powers Pi, the spectral output of the broadband LED source 1 can be generated using equation 2(b). This spectral output, such as the onces shown in FIGS. (4)-(8), can then serve as a guide in the selection of LEDs to make up the broadband LED source 1.

FIGS. (4)-(8) show predicted spectral outputs in arbitrary units for the case where P1 = P2 = P3 = P4 = 1, $\lambda$1 = 0.76 micrometers, $\lambda$2 = 0.8 micrometers, $\lambda$3 = 0.84 micrometers, and $\lambda$4 = 0.88 micrometers. Here, the power is given in arbitrary units and the desired 3dB power level is $\frac{1}{2}$ the peak power level. In particular, FIG. (4) shows the spectral output of the broadband LED source 1 with $\Delta\lambda$1 = $\Delta\lambda$2 = $\Delta\lambda$3 = $\Delta\lambda$4 = 20nm. FIG. (5) shows the output of broadband LED source 1 with $\Delta\lambda$1 = $\Delta\lambda$2 = $\Delta\lambda$3 = $\Delta\lambda$4 = 30nm. FIG. (6) shows the output of broadband LED source 1 with $\Delta\lambda$1 = $\Delta\lambda$2 = $\Delta\lambda$3 = $\Delta\lambda$4 = 40nm. Here, when the center wavelengths $\lambda i$ of the four LEDs 11-14 are spaced at 40nm and the spectral widths $\Delta\lambda i$ are 40nm, the spectral output of the broadband LED source 1 can achieve a spectral flatness better than 1dB. FIG. (7) shows the spectral output of the broadband LED source 1 with $\Delta\lambda$1 = $\Delta\lambda$2 = $\Delta\lambda$3 = $\Delta\lambda$4 = 50nm. Finally, FIG. (8) shows the output of the broadband LED source 1 with $\Delta\lambda$1 = $\Delta\lambda$2 = $\Delta\lambda$3 = $\Delta\lambda$4 = 60nm. Here, when the center wavelengths $\lambda i$ of the four LEDs are spaced 40nm and the individual LEDs 11-14 have a spectral width of $\Delta\lambda i$ = 60nm, the spectral output of the broadband LED source 1 is extremely flat (<<3dB).

If a particular universal fiber optic sensor interface system requires a flatness $\leq$ 3dB, then the spectral widths of FIGS. (5)-(8) are sufficient whereas the sources corresponding to FIG. (4) are not acceptable since FIG. (4) is not sufficiently flat. If the particular fiber optic interface system requires a flatness of about $\leq$ 10dB, then the sources corresponding to FIGS. (4)-(8) would all be sufficient.

FIG. (9) shows a first actual spectral output of the broadband LED source 1 with center wavelengths $\lambda$1 = 0.744 micrometers, $\lambda$2 = 0.7864 micrometers, $\lambda$3 = 0.8328 micrometers and $\lambda$4 = 0.8704 micrometers. The spectral widths were measured to be, $\Delta\lambda$1 = 30nm, $\Delta\lambda$2 = 40nm, $\Delta\lambda$3 = 54nm and $\Delta\lambda$4 = 44nm. The actual spectral output has a spectral flatness better than 3dB. The output power Po coming out of a 100/140 (ratio of core to cladding diameter in micrometers) output fiber pigtail corresponding to output fiber 42 was measured to be $\geq$ 700 micro watts. The combined spectral width is 154 nonometer. FIG (10) shows a second actual spectral output of the broadband source 1 with center wavelengths $\lambda$1 = 0.745 micrometers, $\lambda$2 = 0.785 micrometers, $\lambda$3 = 0.835 micrometer, and $\lambda$4 = 0.8814 micrometers. The spectral widths were measured to be $\Delta\lambda$1 = 30nm, $\Delta\lambda$2 = 40nm, $\Delta\lambda$3 = 57.2nm and $\Delta\lambda$4 = 46.8nm. Again, the actual spectral output has a flatness better than 3dB. The output power Po coming out of a 100/140 output fiber was measured to be $\geq$ 800 microwatts. The combined spectral width is 178.4 nonometer.

The process of mounting the broadband LED source 1 in a mounting 191 will now be discussed. FIG. (11) shows a side view of the broadband LED source 1 in the mounting 191. The same reference numerals as those used in FIG. (1) are used in FIG. (11) whenever appropriate. FIG. (11) shows the side of the broadband LED source 1 corresponding to LED 11 and ball lens fiber 20. The LED 11 is mounted in a copper heat sink 200 which has sufficient thermal mass to remove heat from the LED 11 when it is operating at its maximum operating current (typically 150mA). The copper heat sink 200 has an integral step platform 202 and a fiber stress relieve tube 204 welded at the other end of the copper heat sink 200. Although a ball lensed fiber 20 is being used here as one of the input fibers 34, a cleaved fiber can also be used as discussed above.

The packaging of the LED determines whether a particular input fiber should be of the cleaved or the ball lensed type. For example, if the LED 11 does not include an integral lens, ball lensing should be used to maximize the coupling efficiency. In either case, the jacket of the particular input fiber 20 should be stripped off a distance L from that end closest to the LED 11, where L is a distance slightly longer than the length of the integral step platform 202 as shown in FIG. (11). Then, the ball lens 21 can be formed on the end of the input fiber 34 using a fusion splicer. If no ball lens is used, the stripped end of the input fiber is simply cleaved.

Next, the input fiber is inserted through the fiber stress relieve tube 204. The input fiber is then actively aligned using the automatic optoelectronic device characterization system 100. Namely, the position of input fiber is varied until the coupling efficiency from the LED 11 to the input fiber is optimized. After the coupling efficiency between the LED 11 and the input fiber is optimized, the input fiber is bonded to the integral step platform 202 using epoxy (or solder). After the epoxy at the integral step platform 202 is cured, epoxy (or solder) is applied to bond the input fiber to the fiber stress relieve tube 204. Additional heat shrink tubing 206 is used to secure the output fiber to the fiber stress relieve tube 204. Finally, the process for mounting LED 11 is repeated for LEDs 12-14 yielding mountings 192-194 shown in FIG. (12).

The mountings 191-194 are in turn bonded to an aluminum nitride circuit board 220 also shown in FIG. (12). Aluminum nitride is used because of its excellent thermal conductivity. The aluminum nitride circuit board 220 has dimensions of approximately 2.7" × 2.7". Electrical connection of the LEDs 11-14 to the aluminum nitride circuit board 220 can be accomplished using circuit patterns 224 which are fabricated directly on the aluminum nitride circuit board 220. The circuit patterns 224 are designed in such a way that each of the LEDs 11-14 can be in series with a 47 ohm resistor (not shown), making it possible for pulse operation of the LEDs 11-14. Pulsed operation makes it possible to output higher power levels for shorter periods of time (in the duration of the pulse) than continuous operation. For CW operation, the 47 ohm resistors are replaced by short circuit wires.

The LEDs 11-14 are connected to terminals 226 of a ribbon connector (not shown) which enables interconnection of the broadband LED source 1 to a microprocessor 300 in a universal fiber optic sensor interface system 310 as shown in FIG. (13), which will be discussed in detail below. Finally, referring to FIG. (12), the output fiber 42 can have a connector 228 on the end opposite the end of the output fiber 42 which is coupled to the 4 × 1 waveguide coupler 40. The connector 228 facilitates interconnection of the broadband LED source 1 with the universal fiber optic sensor interface system 310.

FIG. (13) shows the universal fiber optic sensor interface system 310 in which a series of three broadband LED sources 1 can be used. In particular, a multi-broadband source 312 comprises three broadband LED sources 1a, 1b and 1c, each corresponding to broadband LED source 1 in FIG. (1). The broadband LED sources 1a, 1b and 1c output broadband signals on output fibers 42a, 42b and 42c, respectively. The microprocessor 300 communicates with an LED control unit 316 and a detector control unit 318 via a communications bus 314. The LED control unit 316 controls the multi-broadband source 312 based on information received from the microprocessor 300. The detector control unit 318 controls a detector array 320, which can be a single detector array or multiple detector arrays.

The output fibers 42a-42c transmit the broadband optical signals or broadband radiation output from the multi-broadband source 312 to the sensor heads (not shown). The sensor heads encode the broadband radiation in accordance with the positions of flaps and slats located, for example, on the wings of an aircraft. Each broadband signal is associated with a particular sensor head. The resulting encoded outputs from the sensor heads return along return fibers 54a, 54b and 54c. The return fibers 54a-54c are connected to wavelength demultiplexers (WDMs) 56a-56c, respectively. The WDMs 56a-56c each demultiplex the broadband encoded signals from the return fibers 54a-54c, respectively, and the resulting demultiplexed optical signals are detected by the detector array 320. An analog-to-digital (A/D) converter 322 digitizes the analog signals output by the detector array 320 and sends the resulting digitized data via a bus 324 to the microprocessor 300.

The microprocessor 300 processes the digitized data from the A/D converter 322 so that the digitized data can be output to an avionics bus (not shown) belonging to the aircraft. The universal fiber optic sensor interface system 310 requires that each broadband LED source 1a-1c has a spectral output spanning from about 0.75 micrometers to about 0.9 micrometers. In addition, the universal fiber optic sensor interface system 310 requires that each broadband LED source 1a-1c is capable of providing output power Po of more than 500 micro watts at the end of a 100/140 fiber pigtail.

A second embodiment of the invention is a modified broadband LED source 400 shown in FIG. (14). The modified broadband LED source 400 has two interference filter assemblies 402 and 404. The interference filter assemblies 402 and 404 comprise interference filters 412 and 414, respectively. The interference filter assembly 402 comprises LEDs 11 and 13 from FIG. (1), and the interference filter assembly 404 comprises LEDs 12 and 14 from FIG. (1), thereby yielding maximum separation between center wavelengths $\lambda i$. The peak wavelengths $\lambda 1$ and $\lambda 3$ of LEDs 11 and 13, as well as the peak wavelengths $\lambda 2$ and $\lambda 4$ of LEDs 12 and 14, must be separated by an amount larger than their total half spectral widths $(\Delta\lambda 1 + \Delta\lambda 3)/2$ and $(\Delta\lambda 2 + \Delta\lambda 4)/2$, respectively. Interference filter 412 reflects $\lambda 1$ and transmits $\lambda 3$ into an input fiber 420. Interference filter 414 reflects $\lambda 2$ and transmits $\lambda 4$ into an input fiber 422. Input fibers 420 and 422 are connected to a 2 × 1 waveguide coupler or tree coupler 426 and broadband radiation appears at the output fiber 42.

FIG. (15) shows an alternative approach to mounting the LEDs 11-14 of the broadband LED source 1. Here, the LEDs 11-14 are mounted on a single heat sink block 500. The 4 × 1 waveguide coupler 40 is aligned directly to the LEDs 11-14 without using the input fibers 34. This eliminates power loss due to coupling between the LEDs 11-14 and the corresponding input fibers 34 of FIG. (1). In addition, the size of a hybrid package 510 can be reduced.

Finally, the broadband LED source 1 and the modified broadband LED source 400 can be constructed using conventional, commercially available LEDs and couplers with established reliability. Consequently, the broadband LED source 1 and the modified broadband LED source 400 are highly reliable, robust devices and very low cost.

Summarizing, a novel approach to constructing and packaging a broadband LED source has been described. The broadband LED source is capable of outputting a high powered, broadband signal with a flat frequency spectrum and high reliability. Consequently, the broadband optical source can be used in a universal fiber optics sensor interface system such as the type used to control flaps and slats in an aircraft.

While the description of the embodiments of the present invention is directed to the area of fiber optic sensor interface systems, it should be understood that the present invention is also applicable to any system requiring a reliable broadband optical source with a flat spectral output.

What is claimed is:

1. A broadband optical source comprising:
    N optical sources, where N is a positive integer and N $\geq$ 2, said N optical sources outputting a plurality of optical signals having center wavelengths $\lambda i$, spectral widths $\Delta \lambda i$ and powers Pi, where i is a positive integer corresponding to each of said N optical sources, where for every i, said center wavelengths $\lambda i$ are separated by less than said spectral widths $\Delta \lambda i$,
    said N optical sources providing a broadband optical signal when combined together, said broadband optical signal having a maximum power variation within a predetermined value; and
    a waveguide coupler for receiving and combining said plurality of optical signals and for outputting said broadband optical signal.

2. The broadband optical source as claimed in claim 1, further comprising an output fiber for receiving said broadband optical radiation, a first end of said output fiber optically coupled to an output of said waveguide coupler.

3. The broadband optical source as claimed in claim 1, wherein said waveguide coupler is an N × 1 waveguide coupler.

4. The broadband optical source as claimed in claim 1, wherein said N optical sources comprise LED sources.

5. The broadband optical source as claimed in claim 1, wherein for every i, said center wavelengths $\lambda i$ are separated by less than ⅔ of said spectral widths $\Delta \lambda i$.

6. The broadband optical source as claimed in claim 1, wherein for every i, said center wavelengths $\lambda i$ are separated by less than ½ of said spectral widths $\Delta \lambda i$.

7. The broadband optical source as claimed in claim 1, wherein each one of said plurality of optical signals has a frequency component in common with at least one other of said plurality of optical signals.

8. The broadband optical source as claimed in claim 1, wherein a plurality of frequency spectra corresponding to said plurality of optical signals overlap.

9. The broadband optical source as claimed in claim 1, wherein said predetermined value is approximately ½ of the power Pi of the largest power of said optical sources.

10. The broadband optical source as claimed in claim 2, wherein said output fiber is a 100/140 micrometer fiber.

11. The broadband optical source as claimed in claim 10, wherein said waveguide coupler is a 4 × 1 waveguide coupler.

12. The broadband optical source as claimed in claim 1, further comprising a plurality of input fibers corresponding to said N optical sources, a first end of said plurality of input fibers being connected to said waveguide coupler and a second end of said plurality of input fibers receiving said plurality of optical signals.

13. The broadband optical source as claimed in claim 12, wherein said plurality of input fibers comprise ball lensed fibers.

14. The broadband optical source as claimed in claim 13, wherein said plurality of input fibers comprise cleaved fibers with micro-lenses.

15. The broadband optical source as claimed in claim wherein said waveguide coupler is a tree coupler.

16. The broadband optical source as claimed in claim 1, further comprising a plurality of heat sinks each of said N optical sources being mounted on one of said plurality of heat sinks.

17. The broadband optical source as claimed in claim 16, wherein said plurality of heat sinks comprise copper.

18. The broadband optical source as claimed in claim 17, wherein each of said plurality of heat sinks comprises an integral step platform.

19. The broadband optical source as claimed in claim 18, further comprising a plurality of input fibers corresponding to said N optical sources, a first end of said plurality of input fibers receiving said plurality of optical signals and a second end of said plurality of input fibers being connected to said waveguide coupler.

20. The broadband optical source as claimed in claim 19, wherein each of said plurality of input fibers is attached to each of said integral step platforms.

21. The broadband optical source as claimed in claim 20, wherein each of said plurality of heat sinks further comprises a fiber stress relieve tube.

22. The broadband optical source as claimed in claim 21, further comprising a circuit board for mounting said plurality of heat sinks.

23. The broadband optical source as claimed in claim 22, wherein said circuit board comprises aluminum nitride.

24. The broadband optical source as claimed in claim 1, further comprising a single heat sink block for mounting said N optical sources.

25. A broadband LED source comprising:
    N LEDs, where N is a positive integer and N $\geq$ 2, said N LEDs outputting a plurality of optical signals having center wavelengths $\lambda i$, spectral widths $\Delta \lambda i$ and powers Pi, where i is a positive integer corresponding to each of said N optical sources, having said center wavelengths $\lambda i$ separated by less than said spectral widths $\Delta \lambda i$;
    broadband optical source design means for predicting a broadband output, said N LEDs being selected according to said broadband output; and
    a waveguide coupler for receiving and combining said plurality of optical signals and for outputting a broadband optical signal.

26. A method for producing a broadband optical output comprising the steps of:
    selecting, according to a broadband optical source design model, a plurality of optical sources, said plurality of optical sources outputting a plurality of optical signals with center wavelengths $\lambda i$, spectral widths $\Delta\lambda i$ and powers $Pi$, having said center wavelengths $\lambda i$ separated by less than said spectral widths $\Delta\lambda i$;

combining said plurality of optical signals resulting in said broadband optical output.

27. The method for producing a broadband optical output as claimed in claim 26, wherein said selecting step further comprises computing a broadband output.

28. The method for producing a broadband optical output as claimed in claim 26, wherein said selecting step further comprises computing a broadband output based on said center wavelengths $\lambda i$, said spectral widths $\Delta\lambda i$ and said powers $Pi$.

29. The method for producing a broadband optical output as claimed in claim 26, wherein said selecting step further comprises computing a broadband output spectrum.

30. The method for producing a broadband optical output as claimed in claim 26, wherein said selecting step further comprises displaying a broadband output spectrum.

31. The method for producing a broadband optical output as claimed in claim 26, wherein said selecting step further comprises determining a broadband output spectrum based on said center wavelengths $\lambda i$, said spectral widths $\Delta\lambda i$ and said powers $Pi$.

32. The method for producing a broadband optical output as claimed in claim 26, wherein said selecting step further comprises selecting a plurality of optical sources having said center wavelengths $\lambda i$ are separated by less than $\frac{2}{3}$ of said spectral widths $\Delta\lambda i$.

33. The method for producing a broadband optical output as claimed in claim 26, wherein said selecting step further comprises selecting a plurality of optical sources having said center wavelengths $\lambda i$ separated by less than $\frac{1}{2}$ of said spectral widths $\Delta\lambda i$.

34. The method for producing a broadband optical output as claimed in claim 26, wherein said selecting step further comprises selecting a plurality of optical sources, each one of said plurality of optical signals having a frequency component in common with at least one other of said plurality of optical signals.

35. The method for producing a broadband optical output as claimed in claim 26, wherein said selecting step further comprises selecting a plurality of optical sources having overlapping frequency spectra.

36. A broadband optical source comprising:

N optical sources, where N is a positive integer and $N \geq 2$, each of said N optical sources outputting optical radiation having a center wavelength $\lambda i$, a spectral width $\Delta\lambda i$ and power $Pi$, where i is a positive integer corresponding to one of said N optical sources;

a plurality of interferences filters for combining said optical radiation into a plurality of pairs of optical signals;

a plurality of input fibers for receiving said plurality of pairs of optical signals at a first end of said plurality of input fibers; and a waveguide coupler, optically coupled to a second end of said plurality of input fibers, for combining said plurality of pairs of optical signals and for outputting a broadband optical signal.

37. The broadband optical source as claimed in claim 36, wherein said N optical sources comprise LED sources.

38. The broadband optical source as claimed in claim 36, wherein said center wavelengths $\lambda i$ are separated by less than $\frac{2}{3}$ of said spectral widths $\Delta\lambda i$.

39. The broadband optical source as claimed in claim 36, wherein said center wavelengths $\lambda i$ are separated by less than $\frac{1}{2}$ of said spectral widths $\Delta\lambda i$.

40. The broadband optical source as claimed in claim 36, wherein said center wavelengths $\lambda i$ are separated by less than said spectral widths $\Delta\lambda i$.

41. The broadband optical source as claimed in claim 36, wherein each one of said plurality of optical signals has a frequency component in common with at least one other of said plurality of optical signals.

42. The broadband optical source as claimed in claim 36, wherein the plurality of frequency spectra corresponding to said plurality of optical signals overlap.

43. The broadband optical source as claimed in claim 36, wherein $N = 4$.

44. The broadband optical source as claimed in claim 36, wherein said waveguide coupler is an $N/2 \times 1$ waveguide coupler and N is an even number.

45. A fiber optic sensor interface system comprising:

N optical sources, where N is a positive integer and $N \geq 2$, said N optical sources outputting a plurality of optical signals having center wavelengths $\lambda i$, spectral widths $\Delta\lambda i$ and powers $Pi$, where i is a positive integer corresponding to each of said N optical sources;

a waveguide coupler for receiving and combining said plurality of optical signals and for outputting a broadband optical signal; and a sensor head, optically coupled to said waveguide coupler, for receiving and encoding said broadband optical signal and for outputting an encoded broadband optical signal.

46. The fiber optic interface system as claimed in claim 45 further comprising detector means for detecting said encoded broadband optical signal and for outputting an electrical signal.

47. The fiber optic interface system as claimed in claim 46 further comprising analog-to-digital converter means for converting said electrical signal to a digital signal.

48. The fiber optic interface system as claimed in claim 47 further comprising processor means for receiving and processing said digital signal.

49. A universal fiber optic sensor interface system comprising:

a multi-broadband optical source comprising a plurality of broadband optical sources, each of said plurality of broadband optical sources comprising:

N optical sources, where N is a positive integer and $N \geq 2$, said N optical sources outputting a plurality of optical signals having center wavelengths $\lambda i$, spectral widths $\Delta\lambda i$ and powers $Pi$, where i is a positive integer corresponding to each of said N optical sources; and a waveguide coupler for receiving and combining said plurality of optical signals and for outputting a broadband optical signal; and a plurality of sensor heads, said plurality of sensor heads optically coupled to said waveguide couplers, for receiving and encoding said broadband optical signals and for outputting a plurality of encoded broadband optical signals.

50. The universal fiber optic sensor interface system as claimed in claim 49, further comprising detector means for detecting said plurality of encoded broadband optical signals and for outputting a plurality of electrical signals.

51. The universal fiber optic sensor interface system as claimed in claim 50, further comprising analog-to-digital converter means for converting said plurality of electrical signals to a plurality of digital signals.

52. The universal fiber optic sensor interface system as claimed in claim 51, further comprising processor means for receiving and processing said plurality of digital signals.

* * * * *